Aug. 4, 1970 D. PIEL 3,522,474
ELECTRIC SUPPLY MEANS
Original Filed Jan. 20, 1966 2 Sheets-Sheet 1

INVENTOR.
DAVID PIEL

BY

Ostrolenk, Faber, Gerb & Soffen

ATTORNEYS

ELECTRIC SUPPLY MEANS

Original Filed Jan. 20, 1966 2 Sheets-Sheet 2

INVENTOR.
DAVID PIEL
BY
OSTROLENK, FABER, GERB & SOFFEN
ATTORNEYS

United States Patent Office 3,522,474

Patented Aug. 4, 1970

3,522,474

ELECTRIC SUPPLY MEANS

David Piel, New York, N.Y., assignor of ten percent to Barry R. Goldberg and Fredric B. Gershon, both of New York, N.Y.

Original application Jan. 20, 1966, Ser. No. 521,938, now Patent No. 3,383,641, dated May 14, 1968. Divided and this application May 14, 1968, Ser. No. 739,581

Int. Cl. H05b *37/00*

U.S. Cl. 315—169 1 Claim

ABSTRACT OF THE DISCLOSURE

A planar conductive means capable of permitting electrical connection thereto at any location desired over the surface of the assembly which is comprised of a pair of piercible conductive means spaced from one another by suitable piercible insulation means. Connection thereto is made by a connecting assembly comprised of first and second tapered pins. One of said pins is of a length sufficient to pierce only one of the conductive layers. The remaining pin is of a length sufficient to pierce both conductive layers and is provided with an insulating coating or sheathing to electrically insulate the longer pin from the conductive layer which the shorter pin pierces. A power source may be coupled to the conductive layers through a connection means similar to that described above or any other desirable arrangement. The connection means coupling the energized planar assembly may be employed to couple lamps, characters capable of being illuminated or any other sort of load to the power source.

This is a division of application Ser. No. 521,938, filed Jan. 20, 1966, now Pat. No. 3,383,641.

The instant invention relates to means for supplying electricity and more particularly to a novel means including twin-pronged power supply and/or load means and a multi-layer board means for electrically coupling the power source and/or the load utilization devices at any desired location over the surface of the board.

There exist many applications in which the point of connection to a conductor of both an energy source and a load source is not clearly known at the time of installation of the conductor or in which it is desired to freely alter the point of connection at any later time. For example, in the case of illuminated signs where it may be desired to alter the message presented on the sign it becomes extremely tedious to alter such an arrangement in accordance with present day techniques. In the case of display boards where it is desirable to present an illuminated lamp or other indicating device at any point on the surface of the display board or once having located such an indicating device to simply and freely change its location, requires the use of rather an expensive arrangement.

The instant invention is characterized by providing a novel electric board assembly and connecting means to allow the point of connection between both power sources and load utilization means to be made at any point along the surface of the board means and further to permit the point of connection once selected to be simply and easily altered merely by withdrawal of the connection means from one location and insertion of the connection means at another desired location.

The instant invention is comprised of a novel multilayer board having conductive layers interspersed with layers of suitable insulating material. Each layer of insulating material is preferably formed of a suitable insulation material of a predetermined thickness. Each conductive layer is comprised of a screen, preferably of the order of 30 mesh which may be formed of copper, aluminum, copper coated steel, steel or other suitable conductive material. The top layer of the board assembly may be made of paper for applications employing charts, maps, diagrams, raidroad model layouts, slot car setups, sign covers, and the like. In the case of advertising or exhibit applications are desired, the top layer may be formed of a thin plywood veneer. Immediately adjacent and beneath each wire screen a thin foil sheet, comprised of aluminum, copper or other conductor material is provided. If desired, the foil sheet may be laminated to Kraft paper of one mil or more thickness. The bottommost layer of the board assembly may be comprised of a paper board or corrugated board material when being used for games or of a lightweight board when being used for charts. The backing may be comprised of either wood or plywood where more rigidity or a high degree of handling is necessary. The connecting assemblies are comprised of a suitable insulating member having a pair of conductive prongs or pins extending therefrom with one of said pins being substantialy longer than the other and with the longer pin being provided with a suitable insulating coating or sheath which is at least equal in length to the shorter pin. The connecting assemblies may be coupled to lamps, bulbs, neon lights, tracks of electric train sets, or any other output utilization means. The connecting assemblies may also be coupled to an energy source such as an A.C. energy source, or any D.C. energy source, i.e., a battery supply. The connecting pins, whether they be coupled to an energy source or load utilization means may be connected to the board simply by pressing the prongs of the assembly firmly into the board. The longer of the two prongs of each connecting assembly makes electrical engagement with the foil sheet and screen closest to the baseboard of the board assembly while being insulated from the higher level conductive layer. The shorter prong makes electrical connection only with the higher conductive layer of the board assembly. The load utilization devices which are coupled to a suitable connecting assembly may then be located at any point along the surface of the board without any concern being given to the exact position at which it is located. The fully assembly board preferably has a thickness of approximately 1" but may have a greater or lesser thickness, dependent only upon the needs of the user.

The board assembly has a safety feature wherein the conductive layers will burn themselves out in the immediate region of the prongs where a short-circuit condition exists thus providing a substantially self-correcting fault or overload current means to protect the remaining load utilization devices coupled to the board from any damage.

The electrical board assembly operates with equal success when using either A.C. or D.C. sources. In the case where it is desirous to use D.C. sources such as, for example, a "D" (i.e., flashlight battery) holder means are provided for housing the battery, which holding means includes a pair of long and short prongs to permit the connection assembly to be readily and simply pierced into the electric board assembly.

The wire screen has sufficient resiliency so as to permit repeated removal and insertion of a connecting assembly from a single location, or repeated removal and reinsertion of a connecting assembly from a plurality of locations all extremely close to one another so as to guarantee suitable electrical connection each time the connecting assembly is reinserted into the board.

In still another embodiment of the instant invention, the board assembly may be formed of thin elongated strips of relatively pliable material for use in stringing lights or other illuminated devices in ornamental applications such as, for example, Christmas trees and the like. In this embodiment either the connecting assemblies, already described, may be employed or an alternative connecting assembly comprised of a lamp base having a pair of thin flexible conductive plates each having a pin for piercing the strip assembly on opposite surfaces thereof. The resilient plates may suitably be clamped into position by means of a plastic U-shaped clamp which is provided with a groove on the internal surface of each of its areas for receiving a projection on each external surface of the flexible plates to rigidly secure each of the connecting assemblies into position.

It is therefore one object of the instant invention to provide a novel assembly for use in coupling power sources to low utilization means.

Another object of the instant invention is to provide a novel assembly for use in coupling power sources to low utilization means wherein said assembly is comprised of an electric assembly having at least two conductive layers and interspersed insulating layers.

Another object of the instant invention is to provide a novel assembly for use in coupling power sources to low utilization means wherein said assembly is comprised of an electric assembly having at least two conductive layers and interspersed insulating layers and being further comprised of connecting means comprised of a two-prong assembly wherein each prong makes electrical contact with one of said conductive layers and is electrically insulated from the other of said conductive layers of the electric board assembly.

These and other objects of the instant invention will become apparent when reading the accompanying description and drawings in which.

Figures 1, 2, 5A:
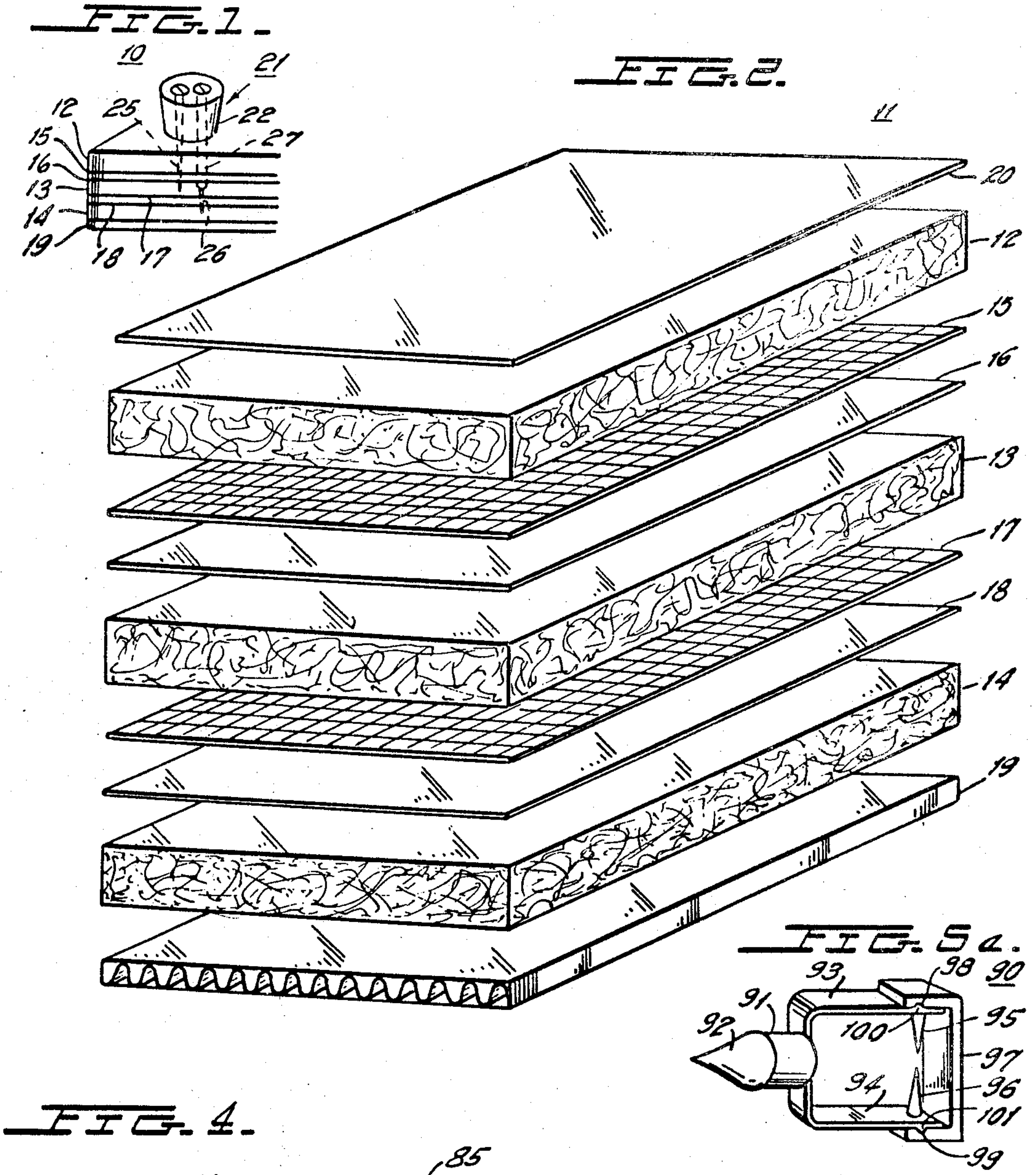
FIG. 1 is a perspective drawing of a board and connecting assembly designed in accordanace with the principles of the instant invention.
FIG. 2 is a perspective exploded view of the electric board assembly of FIG. 1.

FIGS. 3*a*–3*h* are perspective views showing alternative embodiments of the connecting assembly of FIG. 1.

Figure 4:
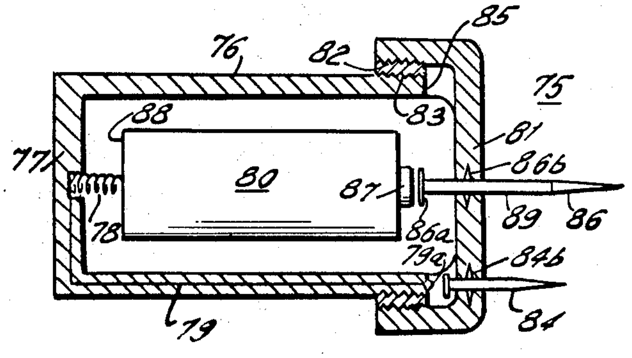

FIG. 4 is a sectional view of a combined battery housing and connecting device for use with the board assembly of FIGS. 1 and 2.

Figure 5:
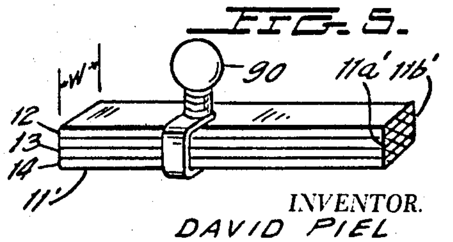

FIG. 5 is a perspective view of the board assembly of FIGS. 1 and 2, being arranged in strip form.

FIG. 5*a* is a perspective view showing a modified connecting means for use with the electric strip arrangement of FIG. 5.

Figure 6:
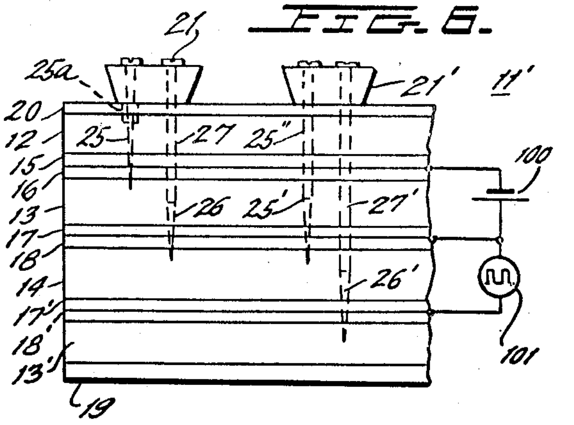

FIG. 6 is a sectional view of another embodiment of a board and connecting assembly designed in accordance with the principles of the instant invention.

Referring now to the drawings, FIGS. 1 and 2 show a board and connecting assembly 10, designed in accordance with the principles of the instant invention. The electric board assembly 11 is best shown in FIG. 2 and is comprised of a plurality of layers 12, 13 and 14 of a suitable insulating material such as, for example, a plastic foam or any other material which has a consistency sufficient to separate the layers of conductive material and to hold the contacting pins.

Sandwiched between the insulating layers 12 and 13 is a wire screen 15 and a thin conductive foil 16. Screen 15 may be formed of copper, aluminum, copper coated steel, steel, or any other suitable conductive material of a mesh fine enough to hold the tapered pins, to be more fully described.

A thin foil sheet 16 is positioned immediately beneath wire screen 15. Sheet 16 is formed of a thin conductive material such as aluminum, copper, or any other suitable inductive means. If desired, the foil sheet 16 may be laminated to Kraft paper having a thickness of approximately 1 mil.

A wire screen 17 and foil sheet 18 substantially similar to the screen and sheet 15 and 16, respectively, are positioned between the insulating layers 13 and 14 and have substantially identical properties to the sheets 15 and 16. The back cover 19 is comprised of a sheet of corrugated cardboard, for example. If desired, sheet 19 may be formed of a layer of wood or plywood where added rigidity becomes necessary. The top sheet 20 may be a sheet of paper, having any kind of figure, plan or diagram printed thereon such as, for example, a chart, a map, a model railroad layout, a slot car setup, a sign cover, or any other suitable diagram. If the board assembly is employed for indoor or outdoor exhibit use, top sheet 20 may be a thin plywood veneer.

FIG. 1 shows the board in the fully assembled position and containing a connecting assembly 21. The connecting assembly is comprised of a base member 22 formed of plastic or any other suitable insulating material and being provided with a pair of openings 23 and 24 for receiving the tapered pins 25 and 26, respectively (see also FIG. 3*d*). Pins 25 and 26 are imbedded into the base member 22 in any suitable manner and project generally in a downward direction. Pin 26 is substantially longer than pin 25 and is coated at 27 with a suitable insulating material or alternatively, covered with a suitable insulating sleeve. The openings 23 and 24 threadedly engage screws 28 and 29 respectively, which are designed to receive and rigidly couple a pair of conductors (not shown). The electrical connecting member 21 is both physically and electrically secured to board assembly 11 simply by pressing the tapered pins into the board until the under side **22*a* of base 22 rests against the top surface of layer 20. In this position, it can clearly be seen that pin 25 pierces through the foil sheet 16 and makes electrical engagement with the fine mesh screen 15. Tapered pin 26 pierces through the foil layer 18 and makes electrical engagement with fine mesh screen 17. The insulating sleeve or coating 27 electrically insulates tapered pin 26 from foil 16 and fine mesh screen 15. The foam layers 12, 13 and 14 act to secure pins 25 and 26 to the board assembly. If desired, pin 26 may be of a length sufficient to pierce the bottom-most layer 19 which may, for example, be formed of wood. Also, top layer 20 may be formed of wood if additional rigidity is desired. The connecting assembly 21 may be employed for the purpose of coupling either load utilization means or a power source such as a D.C. battery or a 110 volt A.C. source to the board. There is no criticality whatsoever in the positioning of connecting assembly 21 since the screen and foil layers 15–17 and 16–18** extend over the entire dimensions of the board. The strands of the fine mesh screen are designed to yield slightly to the piercing of the tapered pins so as to afford good electrical contact and to return substantially to their original position when the connecting assembly is removed.

Figure 3A:
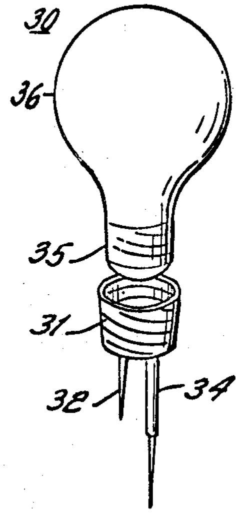

FIGS. 3*a*–3*c* and 3*e*–3*h* show other connecting assemblies which may be employed with the board assembly 11. FIG. 3*a* shows a connecting assembly 30 comprised of a light bulb socket 31 being provided with a pair of pins 32 and 33, which are physically and electrically coupled to socket 31. As was previously the case, pin 33 is longer than 32 and is provided with either an insulated coating or an insulated sleeve 34 for the purpose of electrically insulating tapered pin 33 from screen and foil layers 15 and 16 when the socket 31 is pressed into the board assembly 11. Socket 31 is designed to threadedly engage the base 35 of an electric light bulb 36.

Figure 3B:
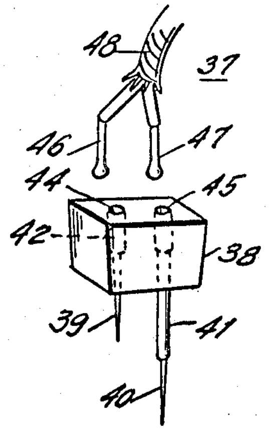

FIG. 3*b* shows another connection assembly 37 comprised of a substantially rectangular shaped base member 38 formed of a suitable plastic or other insulating material and having openings for receiving pins 39 and 40 which are securely anchored to base member 38. Tapered pin 40 is longer than tapered pin 39 and is provided with an insulated sleeve or coating 41 of a length slightly greater than pin 39. The openings 42 and 43 in base member 38 receive cylindrical shaped metallic sleeves 44 and 45, respectively, into which the extreme ends of conductors 46 and 47 of cable 48 are force-fitted.

Figure 3C:
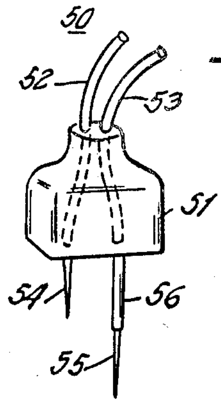
Figure 3D:
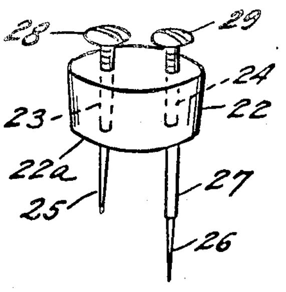

FIG. 3*c* shows still another connecting assembly embodiment 50 which is comprised of an insulating member 51 substantially similar in configuration to the typical wall plug and being adapted to receive a pair of insulated conductors 52 and 53 at its top end. The conductors 52 and 53 pass through suitable openings in the plug member 51 and are electrically secured to pins 54 and 55, respectively. Pin 55 is substantially longer than tapered pin 54 and is provided with an insulated sleeve or coating 56 which is slightly greater in length than pin 54. Connecting assemblies 30, 37 and 50 are all employed with the board assembly 11 in the same manner as substantially described with respect to connecting assembly 21.

Figure 3F:
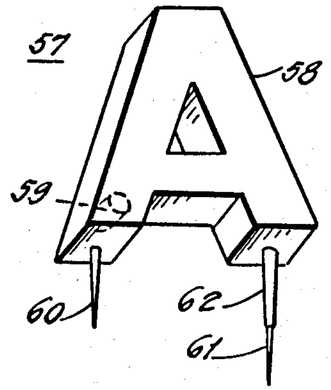
Figure 3G:
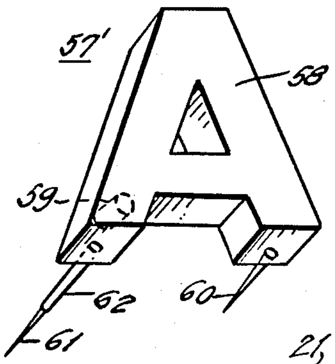

FIG. 3*f* shows still another connection assembly 57 which is formed of a suitable plastic material and is shaped in the configuration of the letter A, as is designated by the numeral 58. The letter 58 is preferably formed of a translucent material and has imbedded therein a light bulb 59 which is electrically connected through suitable conductors imbedded in the letter 58 to the tapered pins 60 and 61. Tapered pin 61 is substantially greater in length than tapered pin 60 and is provided with an insulated sheath or coating 62 substantially greater in length than the tapered pin 60. With the embodiment 57 of FIG. 3*f*, it can be seen that when the letter is mounted to the board assembly 11, that the letter 58 will stand upright. If desired, the embodiment 57 of FIG. 3*f* may be modified as shown by the embodiment 57′ of FIG. 3*g* wherein the tapered pins 60 and 61 are secured to the rearward surface of the letter 58. This embodiment, when the letter 58 is mounted to the board assembly 11, the letter will no longer be upright, but will lay against the top surface 20 of the board assembly.

Figure 3H:
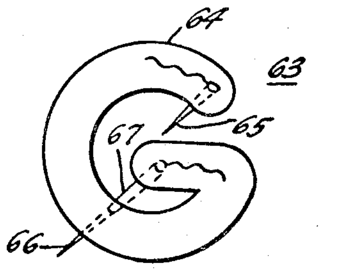

FIG. 3*h* shows still another embodiment 63 of the instant invention which is comprised of a neon tube 64 which is formed into the configuration of the letter G. The ends of the neon tube are provided with a pair of tapered pins 65 and 66, with pin 66 being longer than pin 65 and being provided with an insulating sheath or coating 67 having a length substantially greater than the length of tapered pin 65. The neon tube assembly may be pierced into the board assembly 11 in the same manner as those embodiments previously described.

Figure 3E:
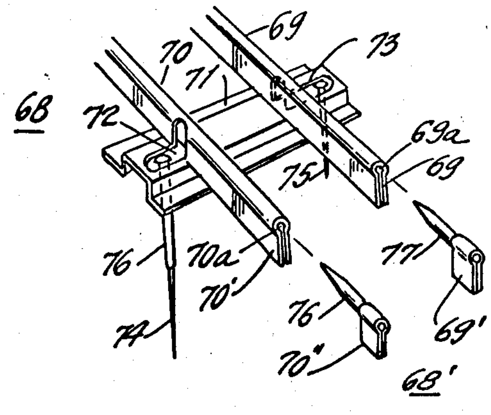

FIG. 3*e* shows still another alternative embodiment of the instant invention which is comprised of a section of track 68 for use in a model railroad set. The track section 68 is comprised of a pair of rails 69 and 70 which are maintained in spaced parallel relationship by the use of the railway ties 71. While only one such tie has been shown in FIG. 3*e*, it should be understood that any sufficient number may be employed. Usually at the minimum each section is provided with such a tie near the ends of the section. The tie 71 may be formed of a suitable insulating material and is provided with a pair of conductive L-brackets 72 and 73 each having an arm secured to the surface of tie 71 with the remaining arm being physically and electrically secured to one vertical surface of the rails 69 and 70. If desired, when the rails are formed in a substantially U-shaped manner as can clearly be seen at their ends 69′ and 70′ respectively, the vertically upright arms of brackets 72 and 73 may be positioned between the arms of the substantially U-shaped rail members. If desired, the L-brackets may be either welded, soldered, or riveted to the rails.

The horizontally aligned portions of brackets 72 and 73 are electrically connected to tapered pins 74 and 75 respectively, with pin 74 being substantially longer than tapered pin 75 and being provided with an insulated coating or sleeve 76 which is at least slightly longer than pin 75. FIG. 3*e* shows a portion of an adjacent track connection 68 which is provided with tapered prongs 76 and 77, secured within the arms of rails 70″ and 69″ and being designed to be inserted into the openings **70*a* and 69*a* of rails 70 and 69**, respectively.

In typical model railroad layout the electrical connection is normally made to one track section and continuity of the electrical connection is dependent upon each track section being mated to adjacent track sections through the use of the prongs 76 and 77 being embraced by cooperating openings **70*a* and 69*a*, respectively. Over a substantially long run or track it has been found that the attenuation of the voltage input is substantially large, causing a significantly noticeable difference in the running speed of the model railroad train as it moves over track sections which are further removed from the point of electrical connection. In addition thereto, the electrical contact between prongs 76 and 77 and their associated openings 70*a* and 69*a*** of the adjacent track section are of relatively high resitivity thereby still further increasing attenuation of the electrical signal supply.

Through the use of track sections of FIG. 3*e*, it is possible to completely avoid the necessity for making good electrical contact between adjacent track sections by the use of the tapered pins 74 and 75 which pierce the board assembly 11 of FIG. 2, in the same manner as previously described with respect to the connecting assembly 21. In addition to establishing excellent electrical contact between the power source and the track section, the pin assemblies firmly secure each track section to the board. The model railroad layout may be made as large as desired simply by providing a board assembly 11 of suitable dimensions. In order to further enhance the authenticity of the model railroad layout the top sheet 20 may be provided with a simulated countryside or city scene and the track sections may be laid in any desired manner over the surface of the board to follow the scene depicted or to follow any other desired arrangement.

FIG. 4 is a partially sectionalized view of a battery housing assembly 75 which may be employed for the purpose of powering the board assembly 11 with a battery source. The assembly 75 is comprised of a substantially cylindrical casing 76 which is provided at its base 77 with a spring member 78 formed of any suitable conducting material. A portion of the spring member 78 is imbedded into the base 77 of casing 76 and is electrically coupled to a conductor 79 which is imbedded within and runs along the base 77 and side of the casing 76 to a point where its opposite end **79*a* is exposed at the upper edge of casing 76. A cap member 81, formed of a suitable insulating material, is threaded along its interior surface 82 so as to threadedly engage the exterior surface 83 of casing 76. A first pin member 84 is imbedded into cap 31 and has its rearward end 84*a* electrically connected to an arcuate conductive segment which may, for example, be ⅛ to ¼ of the entire circumference of shoulder 85. This arcuate segment is provided so as to insure electrical contact between the exposed end 79*a* of conductor 79 with the tapered pin 84. Projections 84*b* and 86*b* act to anchor pins 84 and 86 respectively, in cap 81**.

A second pin 86 is also imbedded into cap 81 and is provided with a blunt end **86*a* for electrically engaging terminal 87 of battery 80. Thus, when the cap 81 is tightened down upon casing 76 battery 80 is spring loaded by virtue of conductive spring member 78 and its electrical terminals, i.e., terminal 87 and rearward surface 88 are electrically coupled to pins 84 and 86. Pin 86 is substantially longer than pin 84 and is provided with an insulated coating or sheath 89 which is slightly greater in length than pin 84. The battery casing 75 is mounted to the board assembly 11 in the same manner as was previously described with respect to any of the connecting assemblies such as, for example, the connecting assembly 21. If desired, a plurality of such battery casing assemblies may be pierced into the board assembly so as to place two or more such assemblies electrically in parallel on the board in order to increase its current rating. The board assembly 11 may be arranged in a strip form 11′, as shown in FIG. 5, with the layers 12, 13 and 14 being formed of an insulating foam or other material of suitable resiliency to enable the strip 11' to be draped in a decorative fashion such as, for example, to be draped about a Christmas tree. Light assemblies 90 may then be secured at spaced intervals along the strip 11'. The strip may be powered at one end, at both ends, or at a plurality of spaced intervals by either a D.C. source or an A.C. source. The strip may be coated along its opposing surfaces 11a' and 11b' or the conductive layers 15–16 and 17–18** may be slightly narrower than the width W of the strips so as to prevent the accidental contact with the conductive layers.

The lamp assemblies may be of any of the types previously described or alternately, may take the form of the lamp assembly 90, also shown in FIG. *5a*, which is comprised of a lamp socket 91 for receiving lamp 92. The base of lamp 92 (not shown) is electrically coupled within socket 91 to a pair of flexible conductive arms 93 and 94, each of which are provided with a tapered pin 95 and 96, respectively, at their outermost ends. The conductive arms 93 and 94 may either be coated with an insulating material, or sheathed in a plastic sleeve to prevent any accidental engagement with the arms when the socket is electrified. The lamp assembly is secured to the strip 11' of FIG. 5 by embracing the strip on opposite sides with arms 93 and 94 and squeezing the sides towards one another causing the tapered pins 95 and 96 to pierce into the strip 11' so that each pin pierces only one of the conductive layers 15–16 or 17–18. The insulating layers 12 and 14 may be sufficient to retain the tapered pins or the substantially U-shaped insulating clip 97 may be employed to embrace the arms 93 and 94 in order to maintain them into engagement with the strip 11'. The clip 97 is provided with a pair of grooves 98 and 99 which receive projections 100 and 101 on arms 93 and 94 in order to properly seat the arms 93 and 94 within clip 97.

It can be seen from the foregoing that the instant invention provides a novel board assembly and electrical connecting assemblies for use in a wide variety of applications where it is desired to provide an electrical connection between one or more power sources and one or more load utilization means. All of the connecting assemblies may be attached to the board in any position desired and may be removed and then again replaced in any other position desired, as often as desired, depending only upon the needs of the user. The board may be formed in any shape, square, rectangular, circular, or any other odd-shaped, or may be arranged in strip form for draping or other decorative purposes and may be powered by either A.C. or D.C. power sources and may be made of either lightweight or heavier more rugged material, depending only upon the application to which the assembly is put. For example, the board assembly may be modified in the manner to form the board assembly 11' of FIG. 6, which is substantially identical to board assembly 11, except that an additional fine mesh screen 17' and foil layer 18' is provided beneath insulating layer 14 with an additional insulating layer 13' being placed between the foil layer 18' and the base member 19. Conductive layers 15–16 and 17–18 are powered by a D.C. source 100, whereas conductive layers 17–18 and 17'–18' are powered by a square pulse source 101. The connecting assembly 21 of FIG. 6 is substantially identical to that shown in FIG. 1 and any load utilization means coupled thereto such as, for example, a lamp, will yield a steady glow. The connecting assembly 21' differs from the connecting assembly 21 in that its pin member 25' pierces through conductive layers 15–16 and 17–18 and is provided with an insulated coating or sleeve 25'' to insulate pin 25' from conductive layers 15–16. Tapered pin 26' pierces through all three conductive layers and is provided with an insulating coating or sleeve 27' which electrically insulates tapered pin 26' from conductive layers 15–16 and 17–18. Thus, a load utilization means such as, for example, a lamp coupled to the connecting assembly 21' will provide a constant flickering or flashing effect. If desired, the powering sources 100 and 101 may be reversed in their arrangement, depending only upon the needs of the user.

If any application where the board assembly is powered by a 110 or 220 volt supply, it may be desirable to provide safety means to prevent accidental piercing of the board by any tool or implement which has not been specifically adapted for use with the board assembly. For example, if a metallic nail, screw driver, fork, or other such implement is accidentally driven into the board so as to short-circuit the conductive layers, it is advantageous to form the top layer 20 of the board assembly 10, shown in FIGS. 1 and 2 of conductive material which is appropriately grounded so as to prevent the holder of such an implement from experiencing an electric shock. Such a structure is unnecessary when the board assembly is powered with low voltage battery power since the batteries are incapable of supplying sufficient current and voltage to in any way harm the holder of such an unauthorized instrument or tool. The top layer may be comprised of metallic layers similar to layers 15 and/or 16 shown in FIG. 2. When the top layer 20 is metallic, then the tapered pin 25, of FIG. 6 for example, is modified to include an insulated coating or sleeve 25a to prevent pin 25 from short circuiting layer 20 to layer 15 and/or 16.

Although there has been described a preferred embodiment of this novel invention, many variations and modifications will now be apparent to those skilled in the art. Therefore, this invention is to be limited, not by the specific disclosure herein, but only by the appending claim.

What is claimed is:

1. Electrical means for coupling electrical sources to at least one load utilization means being comprised of:
   - a board assembly having at least first, second, third and fourth insulating layers of a substantially pliable insulating material;
   - first, second and third conductive layers being positioned between said first and second, said second and third and said third and fourth insulating layers, respectively;
   - a first power source being coupled to said first and second conductive layers;
   - a second power source being coupled to said second and third conductive layers;
   - a first connecting assembly being comprised of a base member;
   - first and second tapered pins projecting from said base member;
   - said first pin being of a length sufficient to pierce said first conductive layer;
   - said second pin being of a length sufficient to pierce said first and second conductive layers and being provided with an insulated coating for electrically insulating said second pin from said first conductive layer;
   - said base member including means for electrically coupling said first and second pins to an electrical element;
   - a second connecting assembly being comprised of a base member;
   - first and second pins projecting from said base member;
   - said first pin being of a length sufficient to pierce said first and second conductive layers and being provided with an insulating coating for electrically insulating said first pin from said first conductive layer;
   - said second pin having a length sufficient to pierce said first, second and third conductive layers and being provided with an insulating coating for electrically insulating said second pin from said first and second conductive layers;
   - said first and second connecting assemblies further including illuminating means;
   - one of said power sources being designed to provide one of said illuminating means with constant illumination;

said remaining power source being designed to cause the remaining connecting assembly illuminating means to constantly flash ON and OFF.

References Cited

FOREIGN PATENTS 571,881 10/1958 Belgium.

1,368,914 6/1964 France.

JOHN HUCKERT, Primary Examiner

R. F. POLISSACK, Assistant Examiner

U.S. Cl. X.R.

313—318; 315—209; 317—101